United States Patent
Tong et al.

(10) Patent No.: US 9,778,786 B1
(45) Date of Patent: Oct. 3, 2017

(54) OPTICAL FINGER NAVIGATION MODULE FOR EXTREME TEMPERATURE OPERATION AND METHOD FOR INCREASING LIFE TIME OF OFN MODULE

(71) Applicant: SAE Magnetics (H.K.) Ltd., Hong Kong (HK)

(72) Inventors: Ka Lap Tong, Hong Kong (HK); Vincent Wai Hung, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 15/076,646

(22) Filed: Mar. 21, 2016

(51) Int. Cl.
*G06F 3/041* (2006.01)
*G06F 3/042* (2006.01)
*G01K 1/14* (2006.01)
*G06F 3/044* (2006.01)

(52) U.S. Cl.
CPC .............. *G06F 3/0416* (2013.01); *G01K 1/14* (2013.01); *G06F 3/0421* (2013.01); *G06F 3/044* (2013.01); *G06F 3/0414* (2013.01)

(58) Field of Classification Search
CPC .... G06F 3/0416; G06F 3/0421; G06F 3/0414; G06F 3/044; G01K 1/14; G09G 3/34–3/3426

USPC .................................................. 345/174, 175
See application file for complete search history.

(56) References Cited

U.S. PATENT DOCUMENTS

| | | | |
|---|---|---|---|
| 6,504,530 B1 * | 1/2003 | Wilson .................. | G06F 3/0418 345/173 |
| 8,816,963 B2 | 8/2014 | Tong et al. | |
| 9,103,658 B2 * | 8/2015 | Mu ....................... | G01B 11/002 |
| 2006/0165140 A1 | 7/2006 | Tan et al. | |
| 2011/0298715 A1 * | 12/2011 | Hung ...................... | G06F 3/042 345/166 |
| 2014/0293149 A1 * | 10/2014 | Tang ....................... | G06F 3/044 349/12 |
| 2016/0320543 A1 * | 11/2016 | Schlaupitz ............ | G02B 6/0035 |
| 2016/0328029 A1 * | 11/2016 | March ................... | G06F 3/0346 |
| 2017/0059746 A1 * | 3/2017 | Tung ....................... | G06F 3/044 |

* cited by examiner

*Primary Examiner* — Stephen Sherman (57) ABSTRACT

An optical finger navigation module includes a light source mounted below a window plate formed on a housing of the module, a driver for outputting a current to the light source, an environmental sensor for sensing an environmental condition and providing a signal, and a sensor integrated circuit including a processor coupled with the environmental sensor for reading the signal and generating a compensated current that corresponds to the signal based on a compensation curve tailor-made for the light source and derived from a compensation algorithm using compensation factors. A method for increasing lifetime of the module is also disclosed.

19 Claims, 6 Drawing Sheets

OPTICAL FINGER NAVIGATION MODULE FOR EXTREME TEMPERATURE OPERATION AND METHOD FOR INCREASING LIFE TIME OF OFN MODULE

FIELD OF THE TECHNOLOGY

The present application relates to an optical finger navigation (OFN) module, and particularly to an OFN module for extreme temperature operation. The present application also relates to a method for increasing the life time of an OFN module by minimizing operation time of a light source and compensating for environmental variation in an OFN module.

BACKGROUND

Light source is one of the most critical components of an OFN module. The operation of OFN module will rely on light reflection from a tracking surface to determine its tracking motion. Depending on the motion sensor technology, light-emitting diode (LED) and vertical-cavity surface-emitting laser (VCSEL) will be the options of light source. Usually, both LED and VCSEL are designed for room temperature operation. They will have the best light emitting efficiency at room temperature.

Optical power is a critical factor that affects tracking performance. To minimize optical power variation at high and low temperatures, current compensation for the light source will be needed. The temperature characteristic of LED/VCSEL can vary a lot among light sources. To give the best operating condition, a tailor-made compensation curve will be needed for individual light source. In this case, a dedicated memory space will be needed to store the compensation setting for every light source. However, this requirement is not properly addressed in the existing OFN IC, so usually there is only limited memory space left. There is a need to develop a compensation algorithm for temperature compensation with minimal memory usage.

Also, in normally operation, light source will be driven by a pulse signal at different frequencies and duty cycles depending on the tracking status. When no tracking surface is detected, the pulse frequency and duty cycle will be slower. When tracking surface is detected, the pulse frequency and duty cycle will be increased to catch up the motion. Based on this object detection algorithm, the light source needs to be always operating in pulse mode. It is desirable to develop an OFN with a proximity sensor to minimize the operating time of light source, and thereby increasing the life time of the OFN module.

Thus, there is a need to optimize the operating mechanism of OFN modules to make it more reliable for operation at high and low temperatures so that life time of the modules will be improved by minimizing operating time and optimizing the driving current of light source during extreme temperature.

The above description of the background is provided to aid in understanding the optical finger navigation module, but is not admitted to describe or constitute pertinent prior art to the optical finger navigation module, or consider any cited documents as material to the patentability of the claims of the present application.

SUMMARY

According to one aspect, there is provided an optical finger navigation module for extreme temperature operation which may include a housing comprising a top window plate and a bottom electrical substrate, a light source mounted below the top window plate, a transmitter driver for outputting a current to the light source, a photodetector and a digital signal processor for capturing and processing light signals from the light source respectively, a temperature sensor mounted on the bottom electrical substrate for sensing an ambient temperature and providing a temperature signal, a sensor integrated circuit having a main processor coupled with the temperature sensor for reading the temperature signal and generating a compensated current that corresponds to the temperature signal based on a compensation curve tailor-made for the light source and derived from a temperature compensation algorithm using a plurality of compensation factors, a memory coupled with the main processor for storing the compensation factors, and a capacitance sensing circuit for sensing a tracking object on top of the window plate.

According to another aspect, there is provided an optical finger navigation module which may include a light source mounted below a window plate formed on a housing of the module, a transmitter driver for outputting a current to the light source, an environmental sensor mounted inside the housing for sensing an environmental condition and providing a signal representing the environmental condition, and a sensor integrated circuit having a main processor coupled with the environmental sensor for reading the signal and generating a compensated current that corresponds to the signal based on a compensation curve tailor-made for the light source and derived from a compensation algorithm using a plurality of compensation factors.

In one embodiment, the environmental sensor can be a temperature sensor for sensing an ambient temperature. The plurality of compensation factors may include a high temperature factor and a low temperature factor. Each factor may include an end-point compensation current and a mid-point compensation current, and a maximum end-point compensation current is determined by a capacity of the transmitter driver for driving the light source.

In one embodiment, the main processor may be coupled with the environmental sensor via an I/O interface.

The optical finger navigation module may further include a photodiode array and a digital signal processor for capturing and processing light signals from the light source respectively after detection of a tracking surface on the window plate.

The optical finger navigation module may further include a memory coupled with the main processor for storing the plurality of compensation factors, each compensation factor having a memory usage of 1-2 bytes.

The optical finger navigation module may further included an apertured sensor cover for covering the sensor integrated circuit.

The optical finger navigation module may further include a proximity sensor for detecting a tracking object on top of the window plate. The proximity sensor can be a piezoelectric force sensor in the form of a sensing film disposed underneath a bottom electrical substrate of the module. The piezoelectric force sensing film may be electrically coupled with the electrical substrate via an electrical connection.

In one embodiment, the proximity sensor can be a capacitance sensor for detecting a capacitance change on the module using a capacitance sensing circuit. The capacitance sensing circuit may include a metal coating coated on an inner surface of the housing between the window plate and a bottom electrical substrate on which the light source, the environmental sensor and the sensor integrated circuit are mounted. The metal coating may be formed by physical vapor deposition, or sputtering and electro-plating deposition.

In one embodiment, the environmental sensor may be integrated into the sensor integrated circuit.

According to a further aspect, there is provided a method for increasing life time of an optical finger navigation module by minimizing operation time of a light source and compensating for environment variation in the optical finger navigation module having a light source and a transmitter driver for outputting a current to the light source. The method may include providing an environmental sensor inside a housing of the module for sensing an environmental condition, reading a signal provided by the environmental sensor that represents the environmental condition, generating a compensated current that corresponds to the signal based on a compensation curve tailor-made for the light source and derived from a compensation algorithm using a plurality of compensation factors, and controlling the transmitter driver to output the compensated current to the light source.

In one embodiment, the environmental sensor can be a temperature sensor. The plurality of compensation factors may include a high temperature factor and a low temperature factor. Each factor may include an end-point compensation current and a mid-point compensation current, and a maximum end-point compensation is determined by a capacity of the transmitter driver for driving the light source.

The method may further include characterizing the light source at different temperatures, determining a current compensation for each temperature and producing an actual current value from the current compensation, translating the actual current value into a compensation factor, and storing the compensation factor in a memory using 1-2 bytes.

The method may further include preparing and storing one tailor-made compensation curve for each kind of light source.

The method may further include providing a proximity sensor for sensing a tracking object when it is placed on top of a window plate formed on the housing of the module.

In one embodiment, the proximity sensor can be a piezoelectric force sensor in the form of a sensing film disposed underneath the housing of the module.

In one embodiment, the proximity sensor can be a capacitance sensor for detecting a capacitance change on the module using a capacitance sensing circuit, the capacitance sensing circuit having a metal coating deposited on an inner surface of the housing of the module.

Although the optical finger navigation module is shown and described with respect to certain embodiments, it is obvious that equivalents and modifications will occur to others skilled in the art upon the reading and understanding of the specification. The optical finger navigation module in the present application includes all such equivalents and modifications, and is limited only by the scope of the claims.

BRIEF DESCRIPTION OF THE DRAWINGS

Specific embodiments of the optical finger navigation module will now be described by way of example with reference to the accompanying drawings wherein:

FIG. 1b is a block diagram of the optical finger navigation module of FIG. 1a.

FIG. 2b is a block diagram of the optical finger navigation module of FIG. 2a.

DETAILED DESCRIPTION

Reference will now be made in detail to a preferred embodiment of the optical finger navigation module, examples of which are also provided in the following description. Exemplary embodiments of the optical finger navigation module are described in detail, although it will be apparent to those skilled in the relevant art that some features that are not particularly important to an understanding of the optical finger navigation module may not be shown for the sake of clarity.

Furthermore, it should be understood that the optical finger navigation module is not limited to the precise embodiments described below and that various changes and modifications thereof may be effected by one skilled in the art without departing from the scope of the protection. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the scope of the protection.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

Figure 1A:
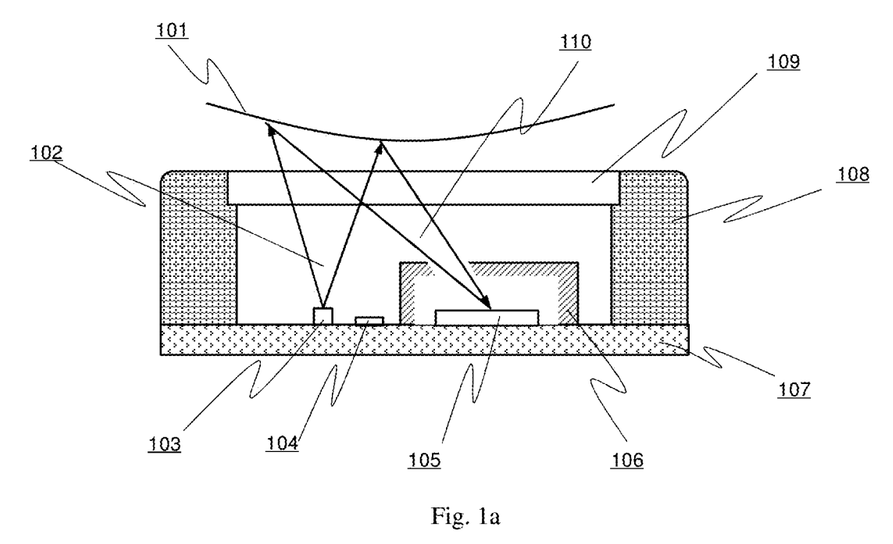
FIG. 1a is a cross sectional view of an optical finger navigation module for extreme temperature operation according to a first embodiment of the present application.
Figure 1B:
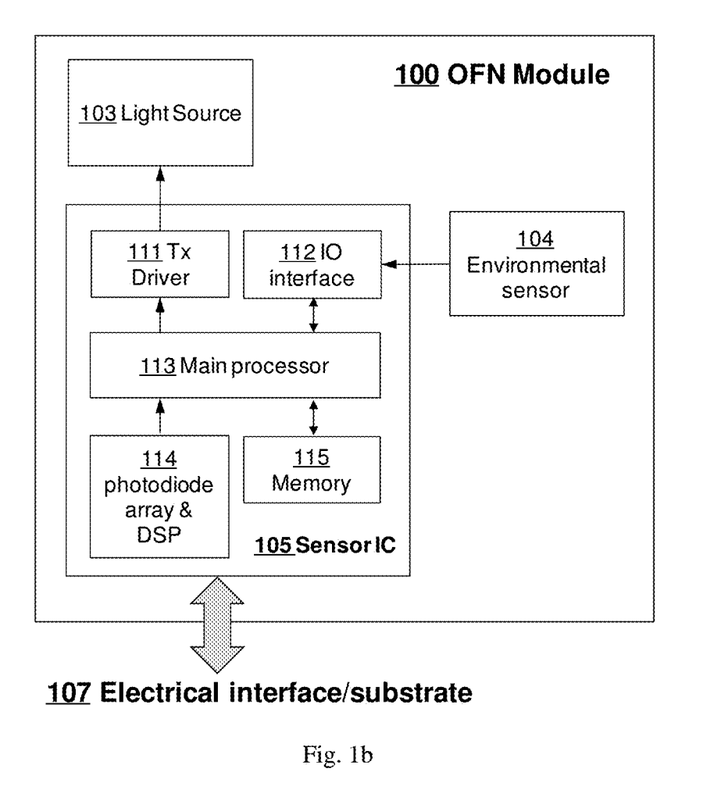

FIG. 1a is a cross sectional view of an optical finger navigation (OFN) module for extreme temperature operation according to a first embodiment of the present application, and FIG. 1b is a block diagram of the optical finger navigation module of FIG. 1a.

The optical finger navigation module may include a housing 108 having a top window plate 109 and a bottom electrical substrate 107. A light source 103, an environmental sensor 104 and a sensor integrated circuit (IC) 105 may be mounted on the bottom electrical substrate 107. The sensor integrated circuit 105 may include a transmitter driver 111, an I/O interface 112, a main processor 113, a photodetector (photodiode array) and digital signal processor (DSP) 114, and a memory 115.

The light source 103 may be mounted below the top window plate 109. The light source 103 can be a light-emitting diode, a vertical-cavity surface-emitting laser, or any other suitable light source. The transmitter driver 111 can be used for outputting a current to the light source 103. The photodiode array and DSP 114 can be used for capturing and processing light signals from the light source 103 respectively.

The environmental sensor 104 may be mounted on the bottom electrical substrate 107 inside the housing 108 for sensing an environmental condition and providing a signal that represents the environmental condition. In the present embodiment, the environmental sensor 104 is a temperature sensor for sensing an ambient temperature and providing a temperature signal. It is understood that the environmental sensor 104 may be any other sensor (e.g. proximity sensor) that could sense an environmental condition which may affect the operation of the optical finger navigation module.

The main processor 113 may be coupled with the temperature sensor 104 for reading the temperature signal and generating a compensated current that corresponds to the temperature signal based on a compensation curve tailor-made for the light source 103 and derived from a temperature compensation algorithm using a plurality of compensation factors. The memory 115 can be coupled with the main processor 113 for storing the compensation factors.

The main processor 113 may read the ambient temperature from the temperature sensor 104 via the I/O interface 112. The main processor 113 can control the output current of the transmitter driver 111 based on the compensation factors that are stored in the memory 115. The transmitter driver 111 can output a current to turn on the light source 103. Light from the light source 103 can be transmitted through the window plate 109.

If there is a tracking object (e.g. a finger) 101 on top of the window plate 109, light from the light source 103 will be reflected by a tracking surface of the tracking object 101. An apertured sensor cover 106 may cover the sensor IC 105 and may only allow light signal in a designated output light path 102 and a return light path 110 to be reflected to the photodiode array 114, and block other stray light. The reflected light signal may then be processed by the digital signal processor 114 and the main processor 113, and then transmitted an electrical signal from the OFN module to an external equipment via the electrical interface 107. As used herein, the term "electrical interface" is interchangeable with "electrical substrate" and "printed circuit board (PCB)".

Figure 2A:
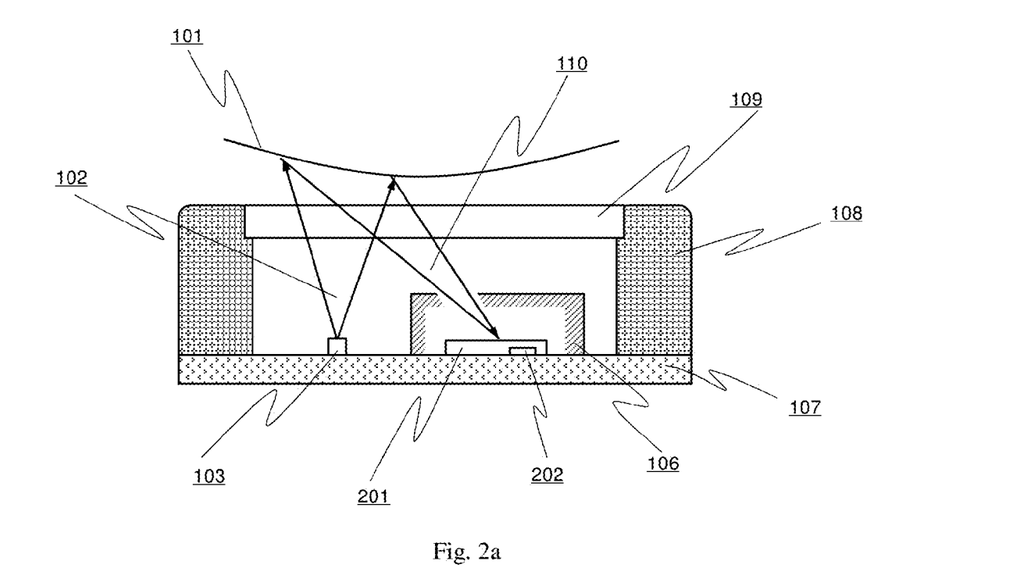
FIG. 2a is a cross sectional view of an optical finger navigation module for extreme temperature operation according to a second embodiment of the present application.
Figure 2B:
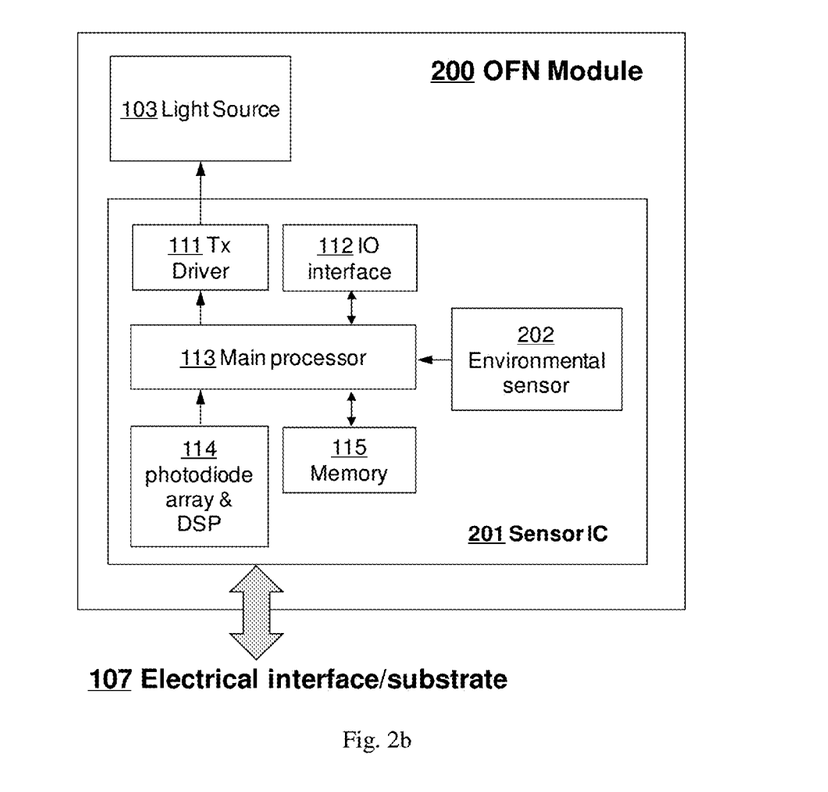

FIG. 2a is a cross sectional view of an optical finger navigation module for extreme temperature operation according to a second embodiment of the present application, and FIG. 2b is a block diagram of the optical finger navigation module of FIG. 2a. The structure of the OFN module in the second embodiment is the same as that in the first embodiment. The only difference is that the environmental sensor 202 can be integrated into the sensor IC 201.

Figure 3A:
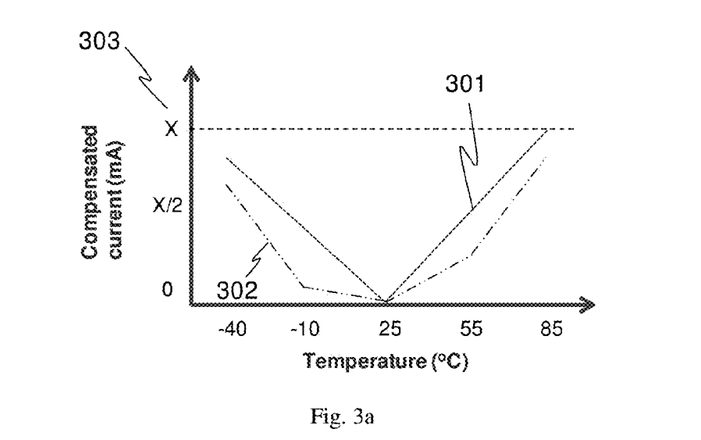
FIG. 3a shows the temperature compensation algorithm of the optical finger navigation module for extreme temperature operation.

FIG. 3a shows the temperature compensation algorithm of the optical finger navigation module for extreme temperature operation.

To ensure a stable tracking performance over temperatures, it is necessary to make sure the strength of the reflected optical signal is strong and stable. To achieve this, the light source output power should be stable over temperatures.

Depending on the temperature characteristic, the light source 103 usually requires different driving currents to maintain similar output optical power level over temperatures. Different kinds of light sources may have different temperature dependence characteristics. In order to maintain a stable power output, a tailor-made current compensation curve 302 is needed for each kind of light source 103.

Temperature characteristic of light sources was not properly addressed in existing OFN modules, and hence usually there is only limited memory space for the compensation factors. In traditional practice, a single pre-determined compensation curve 301 for all kinds of light sources is applied. However, this kind of over compensation will generally shorten the life time of the light sources and the OFN modules.

Thus, a compensation algorithm with minimum memory usage can provide the best fitting for every light source.

Figure 3B:
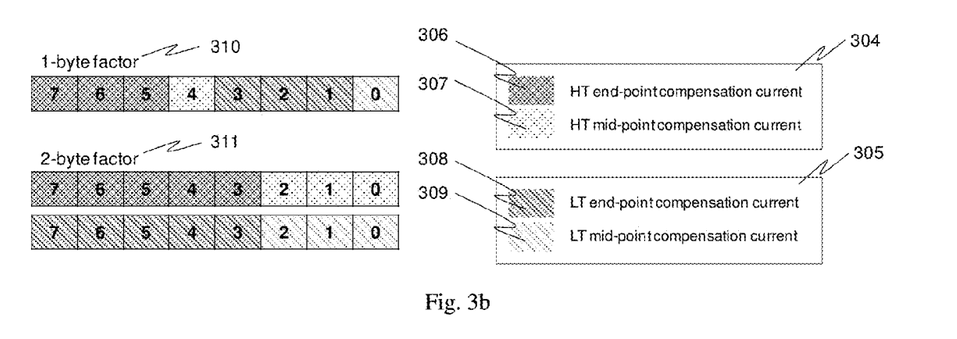
FIG. 3b shows the compensation setting stored in the optical finger navigation module for extreme temperature operation.

FIG. 3b shows the compensation factors stored in the optical finger navigation module for extreme temperature operation.

The compensation factors can have minimum memory usage of 1-2 bytes for each compensation factor. The compensation factors may be divided into two groups, namely high temperature factor 304 and low temperature factor 305. Both high and low temperature factors 304, 305 may be further divided into 2 groups, namely end-point compensation current 306, 308 and mid-point compensation current 307, 309. As shown in the embodiment in FIG. 3a, room temperature 25° C. may be the reference temperature. −40° C. may be the low temperature (LT) end-point, −10° C. may be the low temperature (LT) mid-point, 85° C. may be the high temperature (HT) end-point, and 55° C. may be the high temperature (HT) mid-point. As used herein, "high temperature" means a temperature higher than the room temperature; and "low temperature" means a temperature lower than the room temperature.

The maximum end-point compensation current "X" depends on the capability of the light source driver 111. Different drivers 111 may have different maximum end-point compensation currents "X". The maximum mid-point compensation current 307, 309 may be confined to be X/2 by the firmware. The resolution of the end-point compensation current may equal to X/8 and X/32, in the 1-byte factor 310 and the 2-byte factor 311, respectively. The resolution of the mid-point compensation current X/4 and X/16, in the 1-byte factor 310 and the 2-byte factor 311, respectively. The compensation current X can be positive and negative depending on the light source temperature characteristic.

In actual application, one needs to first characterize the light source at different temperatures, determine the current compensation needed for each temperature and produce an actual current value from the current compensation, translate the actual current value into a compensation factor, and then store the compensation factor in the memory 115.

Figure 4:
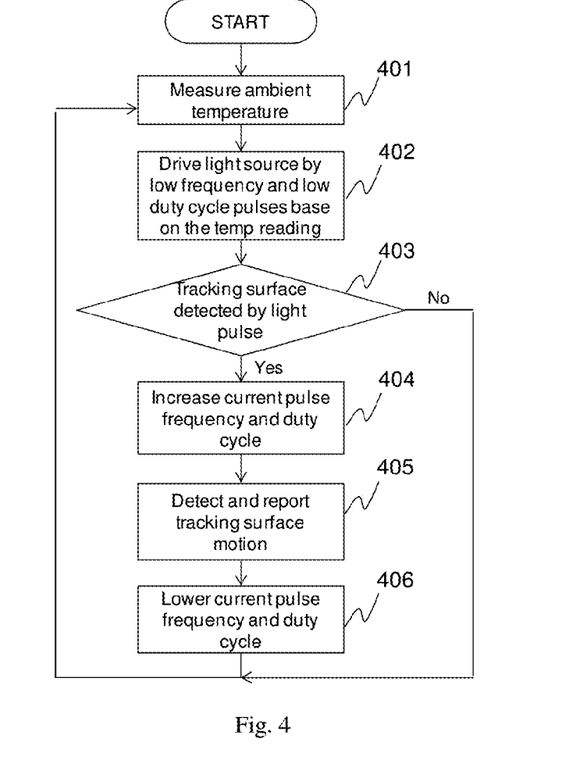
FIG. 4 is a flow chart of the operation of the first and second embodiments of the optical finger navigation module for extreme temperature operation.

FIG. 4 is a flow chart of the operation of the first and second embodiments of the optical finger navigation module for extreme temperature operation.

401: The main processor 103 will read the temperature from the environmental sensor 104, 201 (temperature sensor in these embodiments).

402: Based on the temperature and the compensation curve stored inside the memory 115, the main processor 113 will calculate the most appropriate driving current, and then control the transmitter driver 111 to output such current to the light source 103. The light source 103 can be driven by low frequency and low duty cycle pulses.

403: Light pulse will then transmit through the window plate 109. The photodiode array 114 will determine the present of tracking surface based on the reflected light strength.

404: If tracking surface is present, the current pulse frequency and duty cycle will be increased so as to increase the frame rate to catch up the motion.

405: The photodiode array and DSP 114 will receive and process the reflected signal and then translate it into motion data.

406: When no more tracking surface is detected, the light source driving pulses will be restored to low frequency and low duty cycle.

Figure 5A:
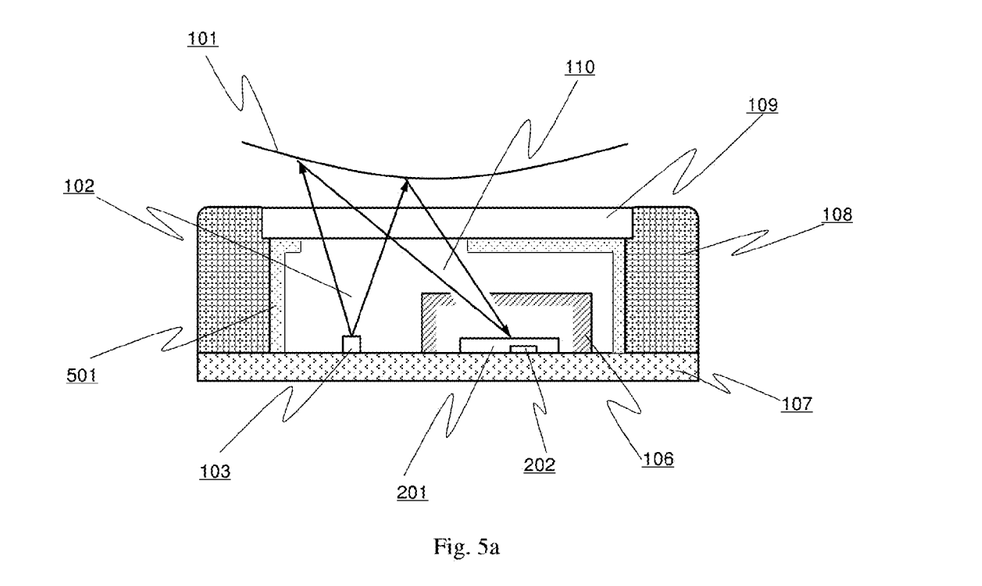
FIG. 5a is a cross sectional view of an optical finger navigation module for extreme temperature operation according to a third embodiment of the present application.
Figure 5B:
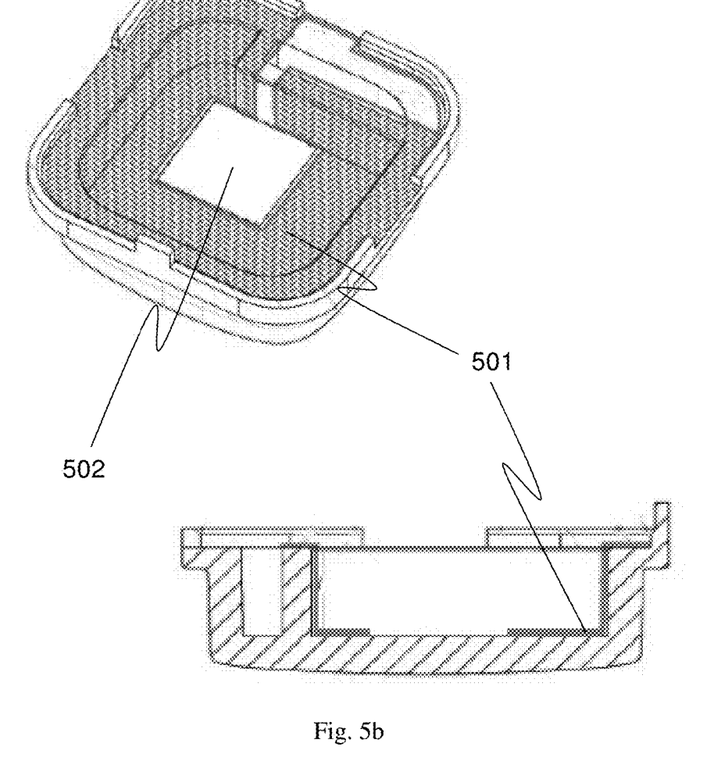
FIG. 5b shows the housing structure of the optical finger navigation module for extreme temperature operation according to an embodiment of the present application.

FIG. 5*a* is a cross sectional view of an optical finger navigation module for extreme temperature operation according to a third embodiment of the present application, and FIG. 5*b* shows the housing structure of the optical finger navigation module for extreme temperature operation according to an embodiment of the present application.

A metal coating 501 may be coated on an inner surface of the housing 108 between the window plate 109 and the electrical substrate 107 on which the light source 103, the environmental sensor 202 and the sensor IC 201 are mounted.

Except the area 502 for transmitting and receiving optical signal, all other areas may be covered by the metal coating 501. The housing 108 may be attached to the printed circuit board (PCB) by silver epoxy, and PCB trace can route the signal to a capacitance sensing circuit.

When a finger 101 is placed on top of the housing 108, the finger 101 and the metal coating 501 can form a capacitor through the window plate 109. The change of capacitance can be transferred from the metal coating 501 to the PCB 107 and then to the capacitance sensor 202.

The metal coating 501 can be formed by different thin metal film deposition methods, such as physical vapor deposition (PVD), and sputtering and electro-plating deposition.

For better reliability and capacitance sensitivity, metal with better oxygen and water resistance and high conductivity (>1e-5 S/m) are preferable for the metal coating. Metal such as gold, silver, platinum and aluminum can be the options.

Figure 6A:
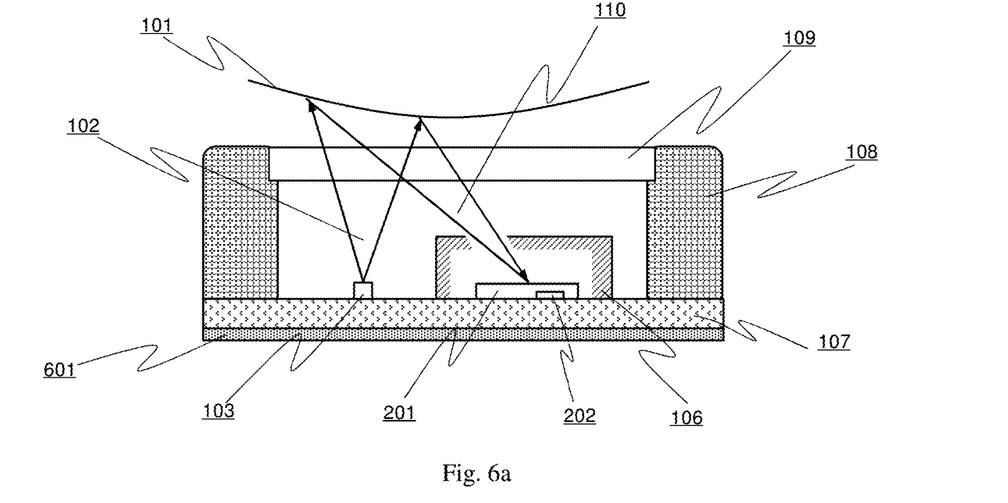
FIG. 6a is a cross sectional view of an optical finger navigation module for extreme temperature operation according to a fourth embodiment of the present application.

FIG. 6*a* is a cross sectional view of an optical finger navigation module for extreme temperature operation according to a fourth embodiment of the present application.

The OFN module can be provided with a piezoelectric force sensing film 601 at the bottom of the electrical substrate 107. When an object or a finger 101 presses on top of the window plate 109, the piezoelectric force sensing film 601 can sense the force and translate the pressure into voltage. The electrical signal can be transmitted from the piezoelectric force sensing film 601 to the electrical substrate 107, and then inputted to the environmental sensor 202.

Figure 6B:
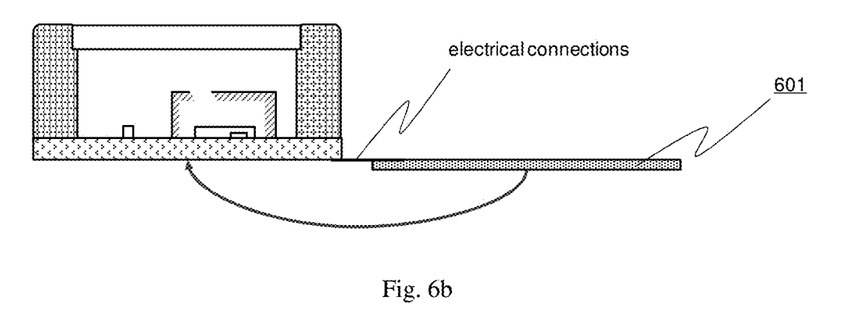
FIG. 6b shows the connection of the optical finger navigation module with a force sensing file according to an embodiment of the present application.

FIG. 6*b* shows the connection of the optical finger navigation module with a piezoelectric force sensing file according to an embodiment of the present application. The piezoelectric force sensing film 601 can be hingedly and electrically connected to the electrical interface 107 of the OFN module via an electrical connection (e.g. wire, PCB flex cable, etc.).

Figure 7:
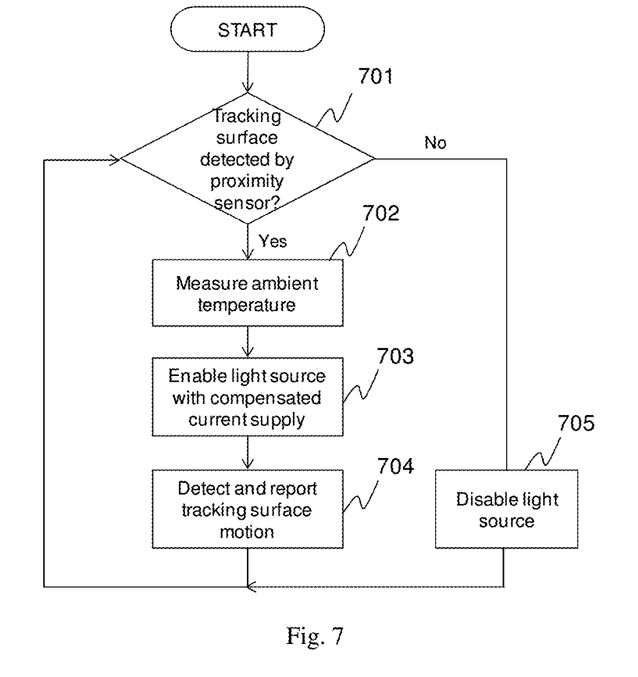
FIG. 7 is a flow chart of operation of the optical finger navigation module for extreme temperature operation with a proximity sensor.

FIG. 7 is a flow chart of operation of the optical finger navigation module for extreme temperature operation with a proximity sensor. Environmental sensor (refer to a proximity sensor in this embodiment) 601 can be used for detecting the tracking surface.

701: The proximity sensor is always active for detecting tracking surface. When no tracking surface is detected, the light source 103 will be off.

702: When tracking surface is detected, the main processor 113 will read back temperature from the environmental sensor (refer to a temperature sensor here) 202.

703: The main processor 113 will calculate the driving current based on the compensation factor that is stored inside the memory 115 so as to calculate the light source driving current, and then control the transmitter driver 111 to output the current accordingly.

704: The photodiode array and DSP 114 will capture and process the reflected light and then send back the signal to the main processor 113. The main processor 113 will translate the data into tracking motion, and report to the external equipment via the electrical substrate 107.

705: If no tracking surface is detected, the light source will be disabled.

While the optical finger navigation module has been shown and described with particular references to a number of preferred embodiments thereof, it should be noted that various other changes or modifications may be made without departing from the scope of the appended claims.

What is claimed is:

1. An optical finger navigation module for extreme temperature operation, the module comprising:
    (a) a housing comprising a top window plate and a bottom electrical substrate;
    (b) a light source mounted below the top window plate;
    (c) a transmitter driver for outputting a current to the light source;
    (d) a photodetector and a digital signal processor for capturing and processing light signals from the light source respectively;
    (e) a temperature sensor mounted on the bottom electrical substrate for sensing an ambient temperature and providing a temperature signal;
    (f) a sensor integrated circuit comprising a main processor coupled with the temperature sensor for reading the temperature signal and generating a compensated current that corresponds to the temperature signal based on a compensation curve tailor-made for the light source and derived from a temperature compensation algorithm using a plurality of compensation factors;
    (g) a memory coupled with the main processor for storing the compensation factors; and
    (h) a capacitance sensing circuit for sensing a tracking object on top of the window plate;
    (i) wherein the plurality of compensation factors comprises a high temperature factor and a low temperature factor, and each factor comprises an end-point compensation current and a mid-point compensation current, and a maximum end-point compensation current is determined by a capacity of the transmitter driver for driving the light source.

2. An optical finger navigation module comprising:
    (a) a light source mounted below a window plate formed on a housing of the module;

(b) a transmitter driver for outputting a current to the light source;

(c) an environmental sensor mounted inside the housing for sensing an environmental condition and providing a signal representing the environmental condition; and (d) a sensor integrated circuit comprising a main processor coupled with the environmental sensor for reading the signal and generating a compensated current that corresponds to the signal based on a compensation curve tailor-made for the light source and derived from a compensation algorithm using a plurality of compensation factors;

(e) wherein the environmental sensor is a temperature sensor for sensing an ambient temperature;

(f) wherein the plurality of compensation factors comprises a high temperature factor and a low temperature factor, and each factor comprises an end-point compensation current and a mid-point compensation current, and a maximum end-point compensation current is determined by a capacity of the transmitter driver for driving the light source.

3. The optical finger navigation module as claimed in claim 2, wherein the main processor is coupled with the environmental sensor via an I/O interface.

4. The optical finger navigation module as claimed in claim 2, further comprising a photodiode array and a digital signal processor for capturing and processing light signals from the light source respectively after detection of a tracking surface on the window plate.

5. The optical finger navigation module as claimed in claim 2, further comprising a memory coupled with the main processor for storing the plurality of compensation factors, each compensation factor having a memory usage of 1-2 bytes.

6. The optical finger navigation module as claimed in claim 2, further comprising an apertured sensor cover for covering the sensor integrated circuit.

7. The optical finger navigation module as claimed in claim 2, further comprising a proximity sensor for detecting a tracking object on top of the window plate.

8. The optical finger navigation module as claimed in claim 7, wherein the proximity sensor is a piezoelectric force sensor in the form of a sensing film disposed underneath a bottom electrical substrate of the module.

9. The optical finger navigation module as claimed in claim 8, wherein the piezoelectric force sensing film is electrically coupled with the electrical substrate via an electrical connection.

10. The optical finger navigation module as claimed in claim 7, wherein the proximity sensor is a capacitance sensor for detecting a capacitance change on the module using a capacitance sensing circuit.

11. The optical finger navigation module as claimed in claim 10, wherein the capacitance sensing circuit comprises a metal coating coated on an inner surface of the housing between the window plate and a bottom electrical substrate on which the light source, the environmental sensor and the sensor integrated circuit are mounted.

12. The optical finger navigation module as claimed in claim 11, wherein the metal coating is formed by physical vapor deposition, or sputtering and electro-plating deposition.

13. The optical finger navigation module as claimed in claim 2, wherein the environmental sensor is integrated into the sensor integrated circuit.

14. A method for increasing life time of an optical finger navigation module by minimizing operation time of a light source and compensating for environment variation in the optical finger navigation module having a light source and a transmitter driver for outputting a current to the light source, the method comprising:

(a) providing an environmental sensor inside a housing of the module for sensing an environmental condition;

(b) reading a signal provided by the environmental sensor that represents the environmental condition;

(c) generating a compensated current that corresponds to the signal based on a compensation curve tailor-made for the light source and derived from a compensation algorithm using a plurality of compensation factors; and (d) controlling the transmitter driver to output the compensated current to the light source;

(e) wherein the environmental sensor is a temperature sensor;

(f) wherein the plurality of compensation factors comprises a high temperature factor and a low temperature factor, and each factor comprises an end-point compensation current and a mid-point compensation current, and a maximum end-point compensation is determined by a capacity of the transmitter driver for driving the light source.

15. The method as claimed in claim 14, further comprising:

(a) characterizing the light source at different temperatures;

(b) determining a current compensation for each temperature and producing an actual current value from the current compensation;

(c) translating the actual current value into a compensation factor; and (d) storing the compensation factor in a memory using 1-2 bytes.

16. The method as claimed in claim 14, further comprising preparing and storing one tailor-made compensation curve for each kind of light source.

17. The method as claimed in claim 14, further comprising providing a proximity sensor for sensing a tracking object when it is placed on top of a window plate formed on the housing of the module.

18. The method as claimed in claim 17, wherein the proximity sensor is a piezoelectric force sensor in the form of a sensing film disposed underneath the housing of the module.

19. The method as claimed in claim 17, wherein the proximity sensor is a capacitance sensor for detecting a capacitance change on the module using a capacitance sensing circuit, the capacitance sensing circuit comprising a metal coating deposited on an inner surface of the housing of the module.

* * * * *